H. B. LAYMAN.
METHOD OF MANUFACTURING SHEET METAL CONNECTING RODS.
APPLICATION FILED APR. 11, 1918.
1,418,087.
Patented May 30, 1922.
9 SHEETS—SHEET 3.
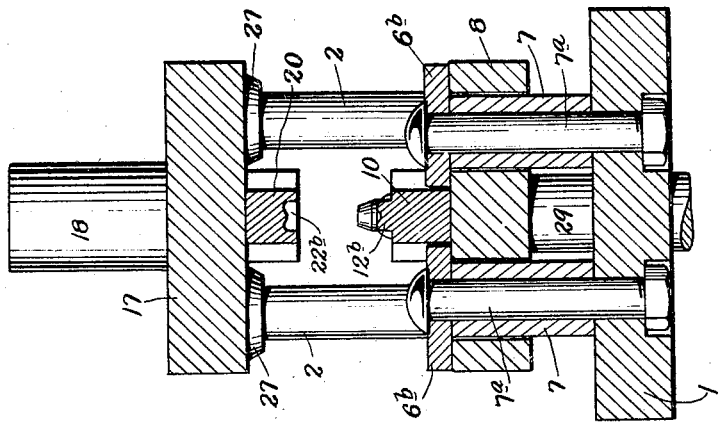
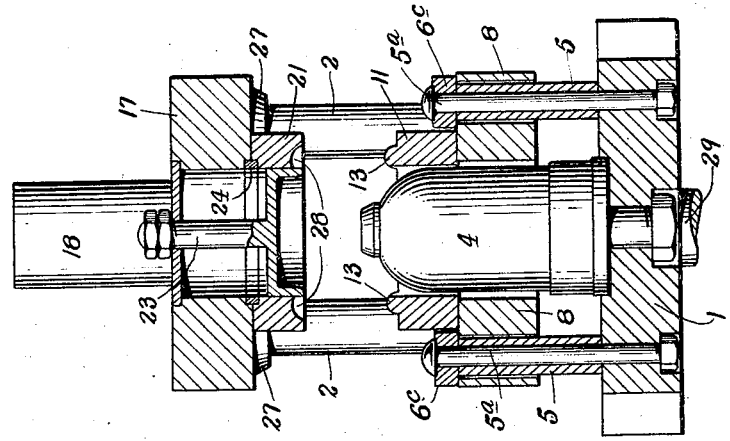
INVENTOR.

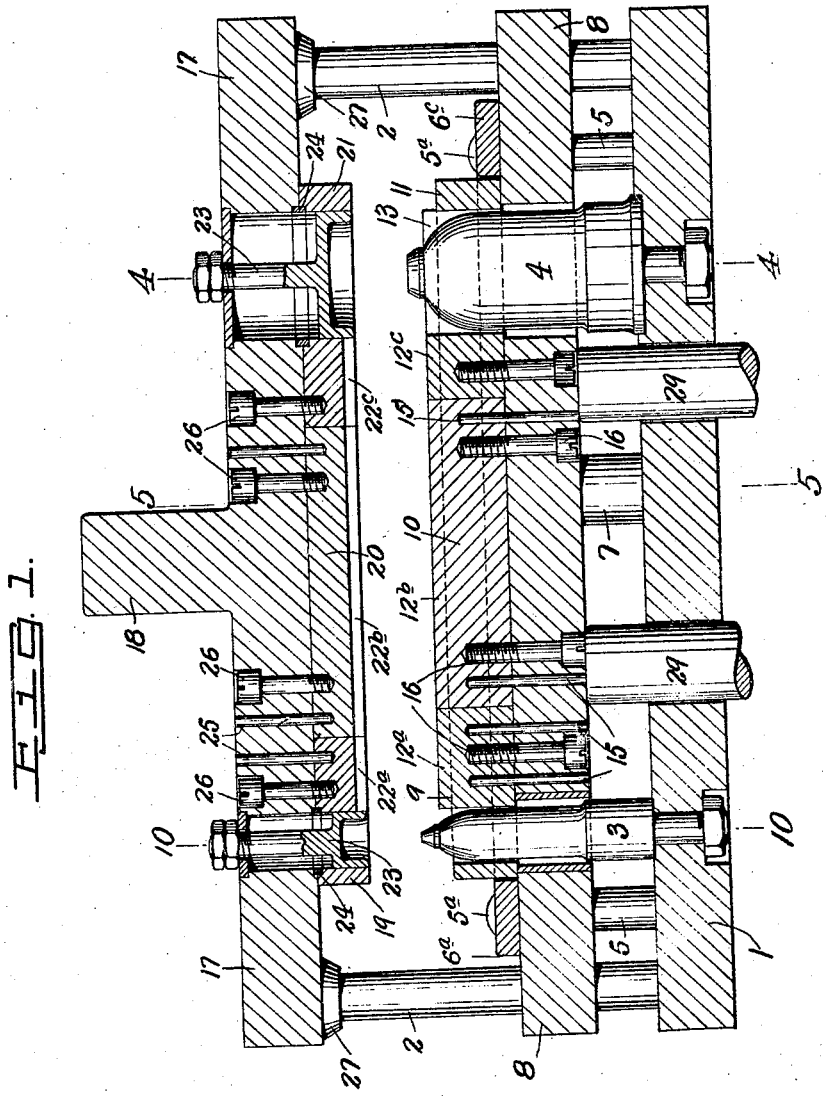

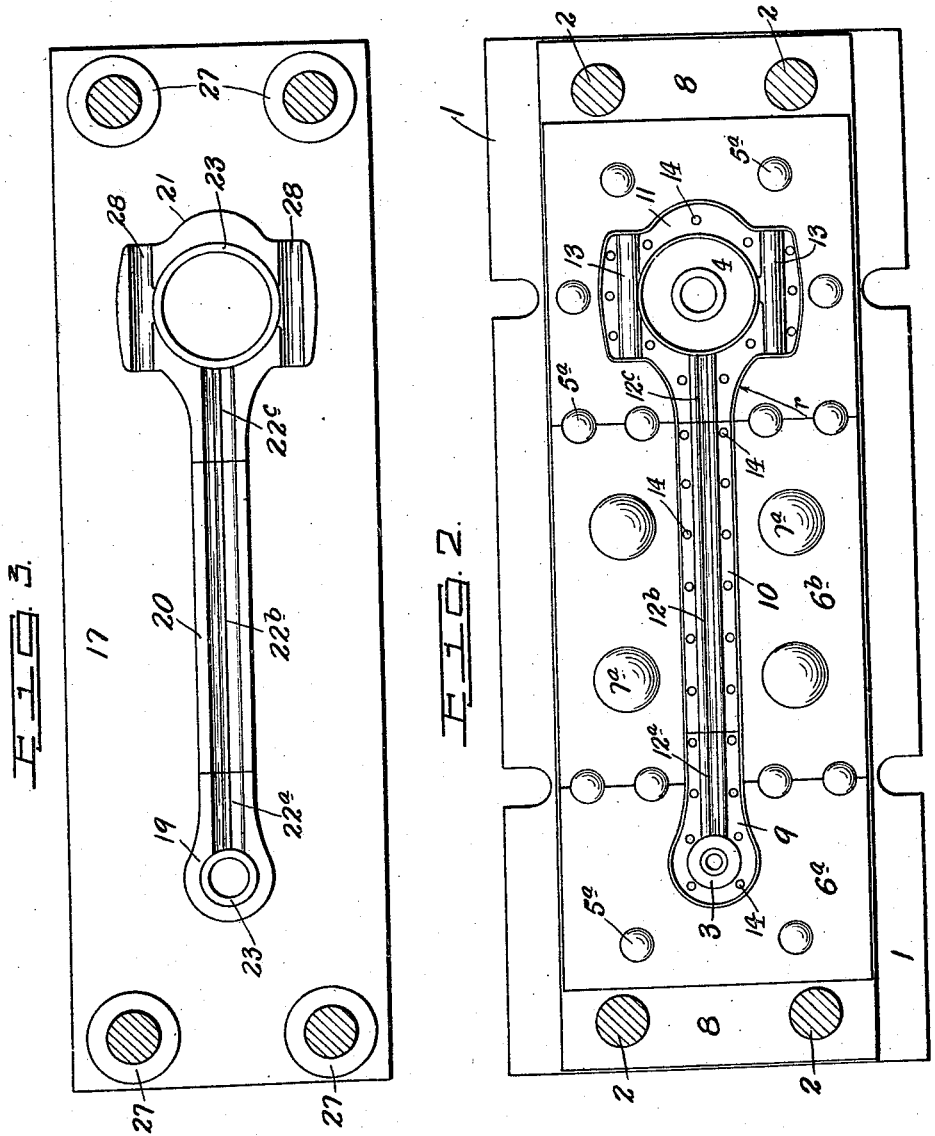

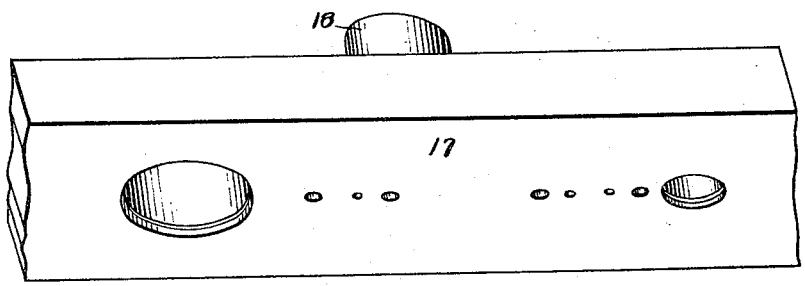
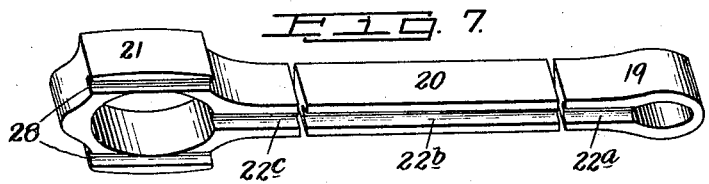
FIG. 7.
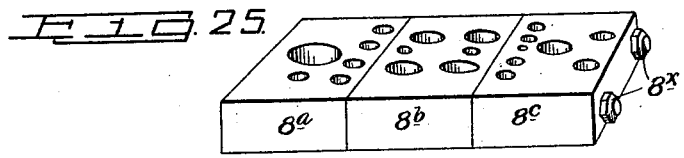
FIG. 25.
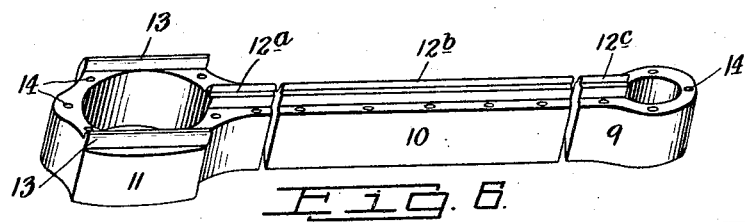
FIG. 6.
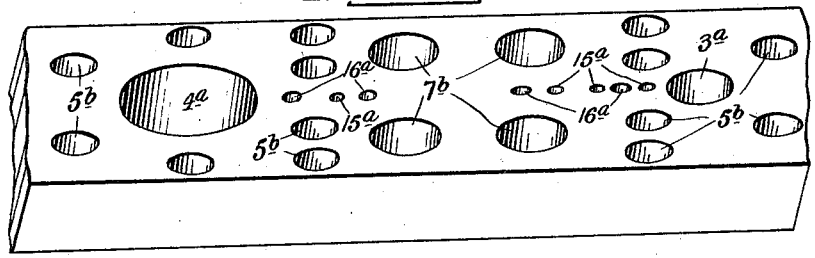

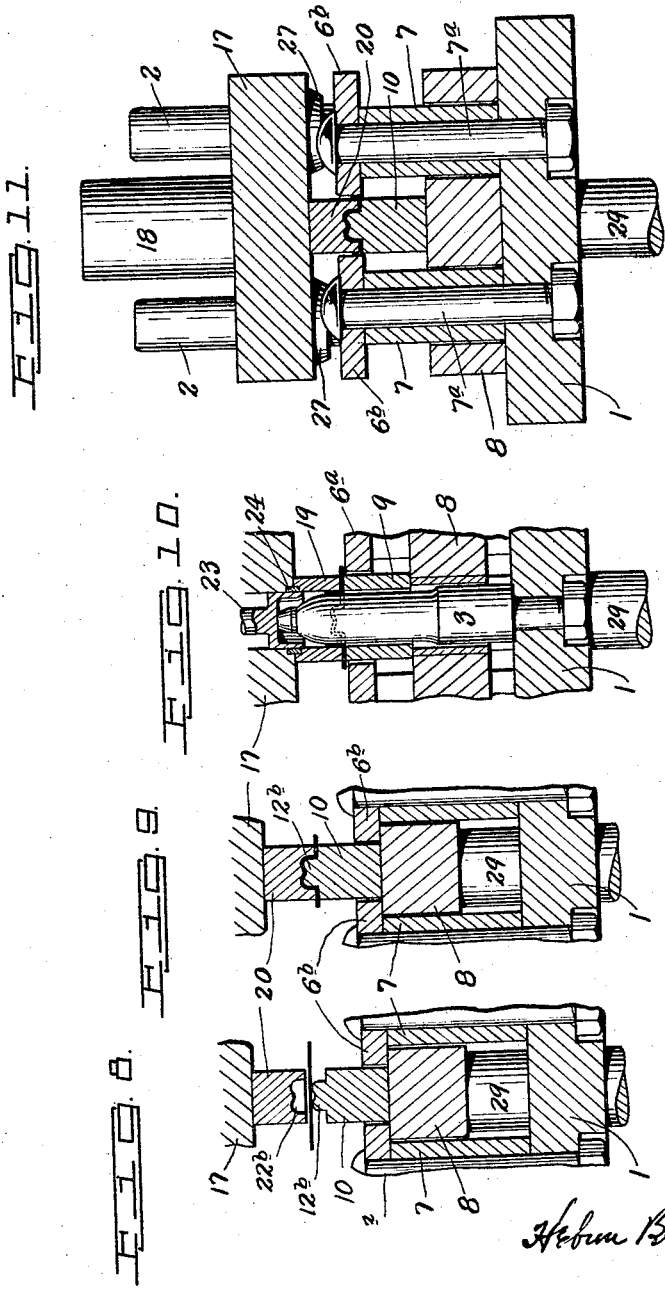

H. B. LAYMAN.
METHOD OF MANUFACTURING SHEET METAL CONNECTING RODS.
APPLICATION FILED APR. 11, 1918.

1,418,087.

Patented May 30, 1922.
9 SHEETS—SHEET 6.

INVENTOR.

H. B. LAYMAN.
METHOD OF MANUFACTURING SHEET METAL CONNECTING RODS.
APPLICATION FILED APR. 11, 1918.
1,418,087.
Patented May 30, 1922.
9 SHEETS—SHEET 7.
FIG. 17.
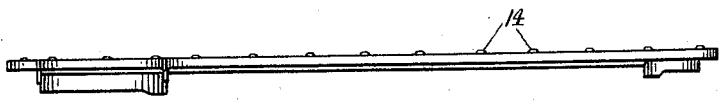
FIG. 16.
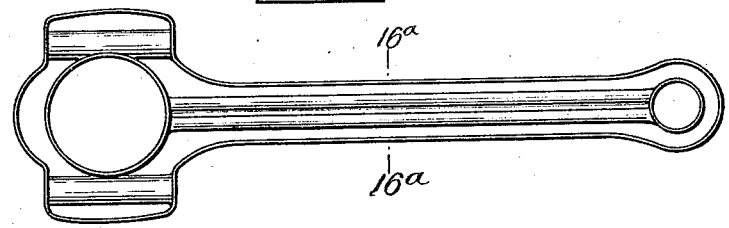
FIG. 16.ᵃ
FIG. 15.
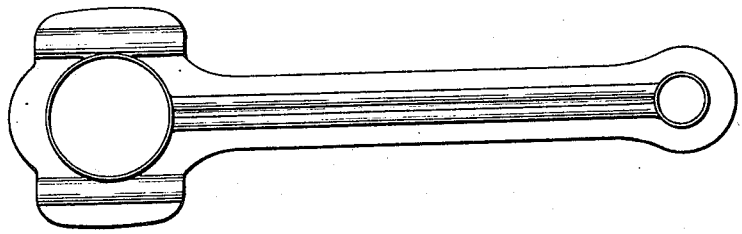
Hebrn Bernard Layman INVENTOR

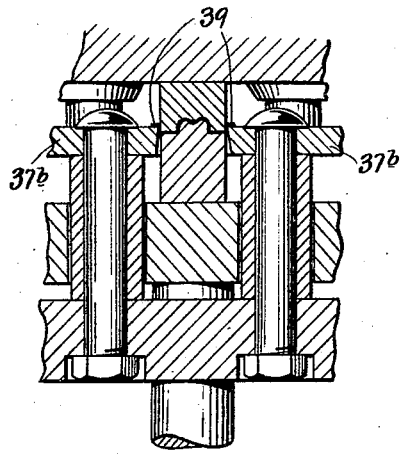
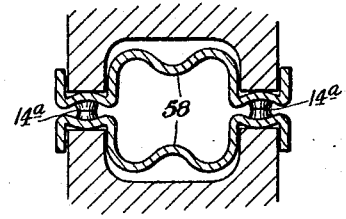
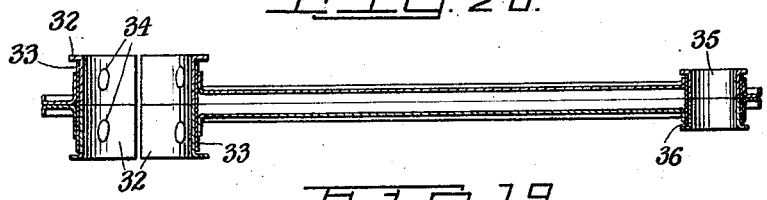
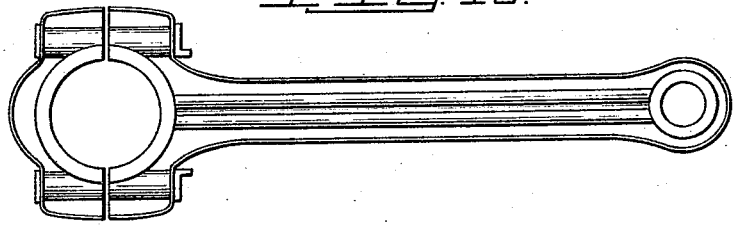
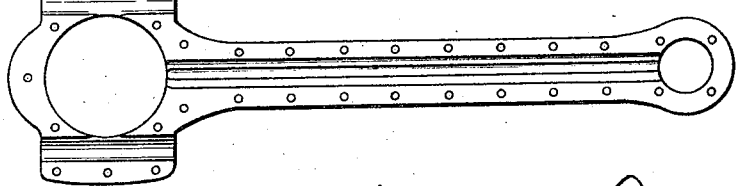

H. B. LAYMAN.
METHOD OF MANUFACTURING SHEET METAL CONNECTING RODS.
APPLICATION FILED APR. 11, 1918.
1,418,087.  Patented May 30, 1922.
9 SHEETS—SHEET 9.
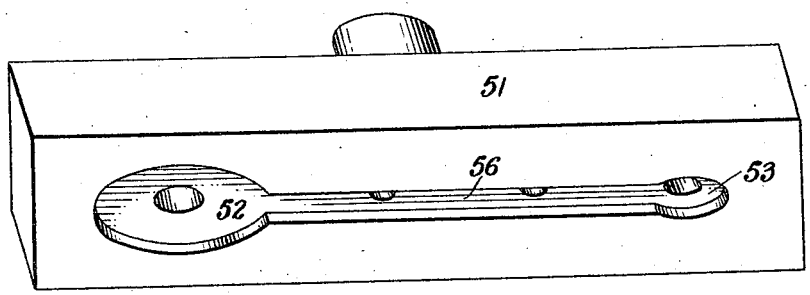
FIG. 23.
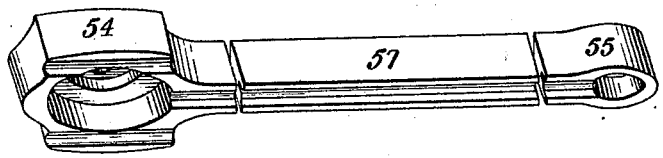
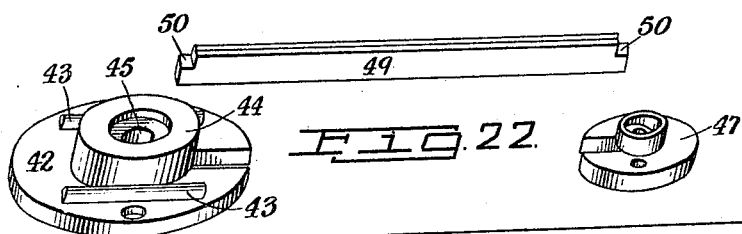
FIG. 22.
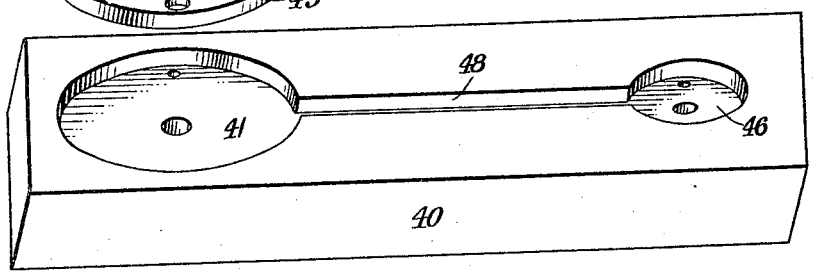
INVENTOR.
Hebron Bernard Layman

UNITED STATES PATENT OFFICE.

HEBRON B. LAYMAN, OF NEW YORK, N. Y., ASSIGNOR TO THE LAYMAN PRESSED ROD COMPANY, INC., OF NEW YORK, N. Y., A CORPORATION OF NEW YORK.

METHOD OF MANUFACTURING SHEET-METAL CONNECTING RODS.

1,418,087.  Specification of Letters Patent.  Patented May 30, 1922.

Application filed April 11, 1918. Serial No. 228,004.

*To all whom it may concern:*

Be it known that I, HEBRON B. LAYMAN, a citizen of the United States, residing in the city, county, and State of New York, have invented certain new and useful Improvements in Methods of Manufacturing Sheet-Metal Connecting Rods, of which the following is a specification, such as will enable those skilled in the art to which it appertains to make and use the same.

This invention relates to an improved method and to means for making sheet metal links, levers, connecting rods and the like, and it has for its object the simplification of the process and the means for making such parts.

Another object is to combine in a single apparatus, or in a single set of tools, all the drawing and forming operations required in making such parts.

Another object is to provide a process of making the parts, by which the parts are themselves improved, as compared with the product derived from previous processes.

Another object is to provide a system of tools by means of which a great variety of sizes or lengths of levers or connecting rods or links may be made without serious duplication of tool work and great expenditure of money.

Other objects will appear hereafter in this specification and in the claims, taken in combination with the drawings.

By way of example in the accompanying drawings, I show in—

Fig. 1 a cross section in elevation of a set of forming tools for forming a connecting rod body section, of the general type shown by me in my application for a patent on connecting rods, filed April 27th, 1915, and bearing Serial No. 24,481. In this figure are shown both the punch and the die and other principal members, which will be referred to more particularly hereafter.

Fig. 2 is a plan of the assembled die of Fig. 1.

Fig. 3 is a plan of the assembled punch of Fig. 1.

Fig. 4 is a cross-section on the line 4—4 of Fig. 1.

Fig. 5 is a cross section on the line 5—5 of Fig. 1.

Fig. 6 is a perspective view of certain principal parts of the die of Fig. 1.

Fig. 7 is a perspective view of certain principal parts of the punch of Fig. 1.

Figs. 8, 9, 10 and 11 show stages of operation of these tools in a single downward stroke of the punch.

Figure 14:
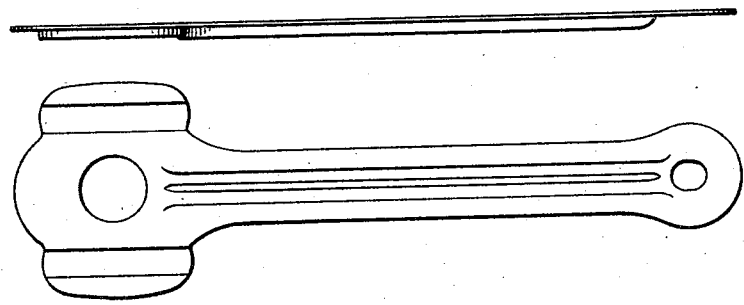
Fig. 14 shows the blank with ribs formed in the shank portion, and semi-cylindrical channels formed in the head end or crank end of the rod. This figure shows the state of the piece when the operation at Fig. 9 is performed.
Figure 13:
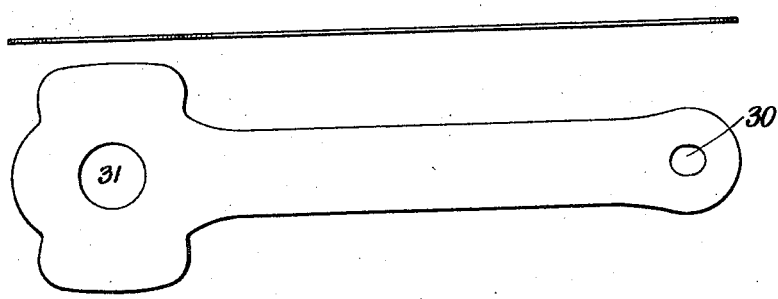
Fig. 13 shows the blank with holes punched in the end portions, and with all the sheared edges trimmed, in which condition the blank is ready to be operated upon in the die of Figs. 1 to 5. This blank is shown in position in the tools at Fig. 8.

Fig. 15 shows the blank of Fig. 14, with a cylindrical boss formed in each end portion, by turning the metal adjacent to the punched holes of Figs. 13 and 14 into an extending cuff. This is known in the art as "spreading" operation. This Figure 15 shows the state of the piece when the operation in Fig. 10 is completed.

Fig. 16 shows the blank as it is formed just before the punch has reached the position shown in Fig. 11, which is to say that in this Fig. 16 the blank is shown with the edges flanged up entirely around the piece.

Fig. 16$^a$ is a cross section of the blank in Fig. 16 at 16$^a$—16$^a$.

Fig. 17 is a side elevation.

Fig. 18 is a plan view of the inner face or abutting face of the blank, and shows the condition of the piece upon completion of the operation, at which time the forming punch is in position shown in Fig. 11 or at the end of its stroke.

Fig. 19 is an elevation of the assembled and completed connecting rod, which includes the body-section of the previous figures.

Fig. 20 is a longitudinal cross section of the rod of Fig. 19.

Fig. 21 shows a modification of the tools of Figs. 1 to 5, and is a cross-section corresponding to Fig. 11.

Fig. 22 is a projection of a modification of the die of Figs. 1 to 5 showing certain principal parts.

Fig. 23 is a projection of a modification of the punch of Figs. 1 to 5.

Fig. 24 is an enlarged cross-section of the body-section of Fig. 18, showing two of the body-sections assembled in electric welding dies.

Fig. 25 shows a modified form of bed plate.

On April 24th, 1915, I filed an application for a patent on "method of making connecting rods," which was given Serial Number 23,729, and a patent for such method was granted me on March 21st, 1916, Number 1,176,301, and the present application covers an improvement of the method there set forth.

This present method, as distinguished from the earlier one, need not embrace, and in fact in practice I find I do not require, the trimming operation which is shown at Fig. 4 in the earlier application. It will be observed that in the earlier method, I formed the crank pin and piston pin bosses by drawing operations, and afterwards pierced these bosses or cut the bottom from them, or I pierced a hole in the bosses, as shown at Fig. 2ª in the Patent No. 1,176,301, and finally completed the drawing operation.

In the earlier application, the bosses in the end portions were drawn, that is to say, in forming the bosses the width of the blank was decreased. In this present method, the blank is securely held between tools and the bosses formed in a different manner, so that the width of the blank does not decrease in the operation of forming the bosses. Where the bosses are drawn as in the earlier application, and as distinguished from this present method in which the bosses are "spread" or formed from the metal immediately around the holes previously punched in the blank, the blanks cannot practically be drawn in from all sides at all times alike, and this necessitates the trimming operation at Fig. 4 in the earlier patent, if the flanged edges of the pieces are to be had of an even height.

Also in the present method the blank is provided with integral protrusions or projections, which are used in electric welding processes, such as patented by A. F. Rietzel, U. S. Patent No. 928,701, and other allied processes.

In the accompanying drawings, like reference characters denote similar parts.

1—is a bed plate or base of a set of tools used to perform the operations shown in Figs. 14 to 18 inclusive.

2—are guide pins rigidly secured to the bed plate.

3—is a spreading punch rigidly fixed to the bed plate. This punch is used for forming the boss in one portion of the blank; in this instance the piston pin boss.

4—is a punch similar to and larger than 3. This punch is used to form the boss in the other end portion of the blank; in this instance the crank pin boss.

5—are tubular members or thimbles used to space the bending plates.

$6^b$ are the bending plates which are located firmly a fixed distance from the bed plate 1, secured thereto partly by the round-headed bolts $5^a$ which pass through the thimbles 5. Additional thimbles of larger dimensions are shown at 7. These, too, are used to support and space the bending plates $6^a$ and $6^c$. These bending plates are really composed of three elements, and they are marked in Fig. 2 as follows:

$6^a$ the piston end.
$6^b$ the shank portion.
$6^c$ the crank end.

The purpose of these bending plates is to turn up the flanges around the edge of the blank, as shown in Fig. 16. This operation is well shown in Fig. 11, which is a cross section of these tools. At Fig. 10 the blank is shown secured between the two moving members of this set of tools, with the edges of the blank about to be turned up or flanged.

Guided on the guide pins 2 is a movable bed plate 8 having clearance holes for the thimbles 5 and 7, which pass through and support the bending plates above this movable bed plate as previously explained. This movable bed plate also has openings to accommodate the fixed punches 3 and 4 around which it moves. To this movable bed plate are secured forming die 9 for the piston end, forming die 10 for the shank portion, and forming die 11 for the crank end. These three pieces are in truth one forming die, but for reasons which appear hereafter, I prefer to split this forming die into three pieces. For convenience, I have shown the shank portion forming die split from the crank end forming die at the end of the radius "r" in Fig. 2. It is obvious that I may part the forming die in any region.

The forming die is provided with a central forming portion, $12^a$, $12^b$ and $12^c$, which is raised above the normal base of the forming die. The purpose of this raised portion is to form the channel in the shank portion of the rod, which is clearly shown in the enlarged cross section in Fig. 24, or in the small cross-section of Fig. $16^a$. Particularly this die is shown performing its function in Fig. 9.

The crank end forming die is provided with semi-cylindrical raised portions 13, which form channels in the blank, and when two blanks are assembled together, these form a bolt boss which is used to secure the cap to the rod.

The three parts composing the forming die have a series of small shallow holes 14. The purpose of these holes is the forming of the electric welding projections, shown in Figs. 17 and 18, and again in Fig. 24. Into these holes some of the metal of the blank is forced at the end of the stroke of the punch. This is in fact a "coining" operation. In this manner the small projections are raised on the face of the blank. In practice these are about .020″ to .040″ high, depending upon the initial thickness of the blank.

The forming die is secured to the moving die plate 8 by dowels 15 and cap screws 16.

In commercial practice connecting rods are made in a multitude of sizes. In the automobile business the sizes of connecting rods are generally referred to by the center distances of the crank pin and piston pin apertures, and these generally average from 7″ to 14″ in length. In many lines of engineering endeavor, various machine elements have been standardized in dimensions, but there is no such thing as a commercially standard connecting rod, nor is there an accepted schedule of sizes of connecting rods. Generally speaking, a host of combinations of piston pin and crank pin aperture diameters are possible commercially for a rod of any given center distance.

The cost of making dies, punches and tools for producing a sheet metal connecting rod of a given size, is so very great, that it has been a serious handicap in obtaining orders for such connecting rods. I have, therefore, designed the system of built-up and interchangeable tools herein described, which successfully fills all requirements.

In practice the dowel pin holes in the forming die 9 are drilled through a jig and made interchangeable, so that any piston end forming die of a wide range of sizes may be fitted to the movable bed plate member 8 by the dowel pin 15 and the cap screw 16. The shank portion and crank pin end dies are similarly jigged and dowelled.

In relation to the piston end, it should be noted that where I desire to produce a rod of the same center distance as that shown in the assembled tools in Fig. 1 but having a different diameter piston pin aperture, it is only necessary to remove the drawing punch 3, and the forming die 9, bending plate 6ᵃ and corresponding parts from the punch, and insert similar parts of the desired dimensions. In like manner the crank pin end of the dies may be changed.

When it is desired to produce a rod of a different center distance, I prefer to, but need not necessarily, provide a new movable bed member 8 for each different center distance. It is obvious that I might split this member as I split the forming dies. This bed plate is not made from tool steel and tempered as are the forming dies, but is made from machine steel, which is very cheap in comparison and easily worked. I find in practice it is more desirable to make a new movable bed member as outlined.

17 is a bed plate of a movable punch, which is fitted to the slide of a press of either the crank or toggle type. To secure the punch bed plate I provide a cylindrical shank 18. This member is preferably made from machine steel. Corresponding to the forming dies 9, 10 and 11, the punch bed plate is provided with forming punches 19, 20 and 21, having a channel $22^a$, $22^b$ and $22^c$ corresponding to the raised portion $12^a$, $12^b$ and $12^c$ of the dies. The forming punch 19 is provided with knockout 23, and is attached to the punch by the thimble 24 and dowel 25 and cap screw 26. The crank end punch 21 is provided with similar parts.

The punch bed plate has hardened steel bushings 27 to accommodate the guide pins 2. The purpose of the knockouts 23 is to strip the formed blank from the punch after the completion of the forming operations, and to this end it is intended that the knockout be positively operated by cam or similar means by the usual moving part of the press, timed with the travel of the punch. The movable bed member 8 is supported above the die bed 1 by substantial steel plungers 29, which pass through the bed plate. These plungers may be spring supported or cam controlled from the rocker shaft, with which many types of press are regularly provided. In practice I prefer to cam control the plungers 29, having also a spring or equivalent means for taking up the lost motion.

Fig. 4 as previously stated, is a cross section on the line 4—4 of Fig. 1, and shows the spacing thimbles 5 permanently locating the bending plate $6^c$ upon the die bed plate 1. Also the movable die bed 8 is shown with clearance holes to accommodate the spacing thimbles 5. The semi-cylindrical ribs 13 in the crank end forming die 11 are clearly shown. Also in the forming punch 21 is shown the semi-cylindrical recesses 28 corresponding to the ribs 13 of the die.

In Fig. 5 the forming die 10 and punch 20 of the shank portion are shown in cross section, and other parts previously referred to.

In Fig. 6 is shown a perspective view of the movable die bed 8 and the forming dies 9, 10 and 11. In the movable die bed is shown a hole $4^a$ which accommodates the spreading punch 4 of Fig. 1, and similar hole $3^a$ to accommodate the punch 3 in Fig. 1. Likewise, holes $15^a$ and $16^a$ to accommodate the dowels and cap screws 15 and 16 respectively. The holes $5^b$ and $7^b$ are to accommodate the spacing thimbles 5 and 7.

On the drawing die 11 are shown the semi-cylindrical portions 13 for forming the bolt bosses and the rib portion 12ᶜ for forming the channel in the shank portion of the rod.

Fig. 7 is a perspective view of the punch bed plate 17 and the forming punches 19, 20 and 21.

Fig. 8 is a cross section through the shank portion of the forming tools, showing the blank in place on the forming die with the punch about to descend. In practice the blank in Fig. 13 is located on the forming die, the contracted ends of the forming punches 3 and 4 fitting into the holes 30 and 31 respectively.

Fig. 9 is a section similar to Fig. 8 with the forming punch descended to where it has completely formed the channels in the shank portion of the rod. It will be observed that while the punch 20 has descended the die 10 fixed to the movable bed plate 8 is still in its uppermost position, supported by the plungers 29. It will also be noticed that the blank is a considerable distance above the upper face of the bending plate 6ᵇ. From the cross section of the tools shown in Fig. 4 considered in combination with Fig. 9, it will be clear that the ribs forming bolt bosses are drawn at the time that the shank ribs are being formed. This time the blank is in the condition shown in Fig. 14.

Fig. 10 is a cross section of the tools through the line 10—10 of Fig. 1, and shows the forming punch and die having descended together and having turned up the metal around the hole 30 of Fig. 13 to form a cuff or boss for the piston pin. It will be noted that the movable die bed 8 has now descended with the punch bed 17; the blank, in the meantime, being gripped between the forming die and the forming punch. It will be seen that the blank is just about to enter the bending plate 6ᵃ. At this time the blank is in the condition shown in Fig. 15.

In Fig. 11 the punch bed 17 and the movable die bed 8 have descended, carrying the blank through the bending plate, so that the movable die bed rests upon the fixed die bed 1. It is at the last of this stroke when these two die beds contact, that the welding projections are formed on the piece, and it is given permanent set. The blank is then in the condition shown in Figs. 16, 17 and 18. It will be understood that the plungers 29 recede from the bed plate 8, the movement of these plungers being suitably timed. Eventually, the downward movement of the punching and forming dies is arrested by the bed plate 8 impacting against the fixed die bed 1. The shock of impact is effective to cause the punch members 9, 10 and 11 to strike the blank a sharp blow against the forming dies. The amount of the blow will, of course, depend upon the movement of the plunger 29 with respect to the die bed plate 8.

In the previous process of Layman, the blanks were not given a permanent set, with the result that when these pieces come from the tools, the abutting flanges by which they are welded together are not flat, but are irregularly shaped. This I have found by actual practice materially interferes with the welding of the two parts together. Further, when the blanks were not given permanent set, the raised portions of the blank, which together form bolt bosses, will not lie parallel, but they come from the dies curved and otherwise distorted. This is not due to any fault or die-making, but to the springing of the metal in the blanks. Then, too, these bolt boss ribs do not lie parallel when they are not given permanent set, but incline in one or both planes in varying degrees. This is all obviated in the improved process by giving the blanks permanent set in their finished form, as derived from the forming punch and die, when the two die beds contact as described.

Figure 12:
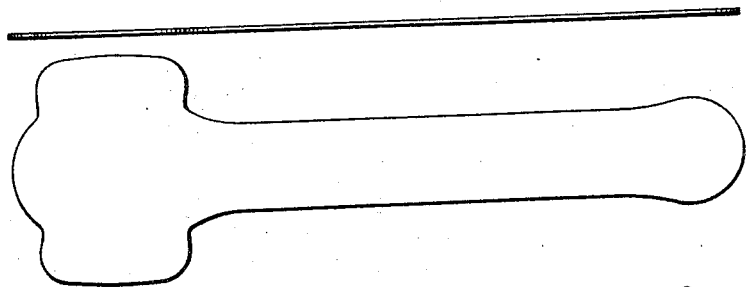
Fig. 12 shows the shape of a blank of sheet metal used to form a connecting rod body-section.

In Fig. 12 is shown the blank as cut from the strip stock, and

Fig. 13 the same blank with the punched holes 30 and 31 previously referred to. This is the second step in the process of making a connecting rod.

The third step is this: The sheared edges of the blank are trimmed to remove the portion crystallized through the blanking and punching operations. This trimming may be by strapping, or grinding, or milling, or broaching, or in any desired manner. When these crystallized edges are removed, it is possible to form deeper cuffs on the blank, as shown in Figs. 10 and 15 than would otherwise be possible.

Fig. 14 shows the next step in the process, which is that of ribbing the shank portion and forming the bolt bosses in the end portion, after which the step in Fig. 15 is performed.

I desire to point out here that the order of the steps 14 and 15 may be changed and not without satisfactory results; similarly the punching of holes 30 and 31 in Fig. 13 may be accomplished before the blank is cut from the strip, as shown at Fig. 12.

Figs. 16, 17 and 18 show the succeeding steps in the process, and these have been referred to previously in detail.

In Figs. 19 and 20 the assembled and finished rod is shown, incorporating the body sections of Fig. 18. In these Figs., 32 are flanged bushings fitted within a liner bushing 33 in the crank end of the rod. 34 are holes for locking babbitt in place. 35 and 36 are bushings in the piston end corresponding to those in the crank end referred to.

In Fig. 21 I show a modification of the tools of Figs. 1 to 5 inclusive. More particularly this cross section is similar in all respects to the cross section of Fig. 11, except that the bending plates $6^b$ of Fig. 11 are here exchanged for trimming dies $37^b$. It should be noted that the forming punch 20 of Fig. 11 becomes also a trimming punch in this Fig. 21. 39 is the scrap trimmed from the blank. In some cases it is not necessary to provide connecting rods or levers or links with the T-shaped flange formed by the extending supplementary flanges which are shown turned up in Fig. 11, and for the purpose of accomplishing which the bending plates $6^b$ are provided. In such cases I may elect to trim the blank as shown in Fig. 21, exchanging for the bending plate the trimming die here shown.

Figs. 22 and 23 show in perspective a simplified form of tools shown in Figs. 1 to 5 inclusive. In these new figures tools are shown without removable die bed 8 of Fig. 1 and the fixed bending plates $6^a$, $6^b$ and $6^c$. In short the tools here shown are for the forming operations alone. 40 is a die bed which it is intended shall be rigidly fixed to the bolster plate of the press. 41 is a cylindrical recess to accommodate the crank end forming die 42 for drawing a connecting rod section; 43 are raised portions for forming the bolt bosses. 44 is a drawing punch. 45 is an opening to admit a knockout which is not here shown. 46 is a recess to accommodate piston end forming die 47. 48 is a formed channel to accommodate shank portion forming die 49. It will be observed that the dies 42 and 47 are provided with recesses to align the die 49, and that this last member has stepped shoulders 50, by means of which it is securely held in place under the raised central portions of dies 42 and 47 when the whole is assembled.

In Fig. 23, 51 is a drawing punch bed having cylindrical recesses 52 and 53 to accommodate the crank end forming punch 54, and the piston end forming punch 55. It also has a formed channel 56 to receive the shank forming punch 57.

In Fig. 24, 58 are connecting rod body-sections having welding projections $14^a$ formed in the dies shown in Fig. 2. It will be observed that in this enlarged cross section the body-sections are shown provided with cavities surrounding the welding projections $14^a$. The purpose of these cavities is to admit the "flash" from welding; or, in other words, to provide a well or wells in which the molten metal which is squeezed out of the projections in the process of welding may accumulate. When this provision is not made, the "flash" from the welds may hold the two body sections slightly apart.

Fig. 25 shows a modified form of the movable bed plate 8. Here the plate is made up of a multiplicity of parts $8^a$, $8^b$, $8^c$ which are secured together by bolts $8^x$.

Having fully described my invention, what I claim as new and desire to secure by Letters Patent, is:

1. The method of forming a sheet metal connecting rod, link, lever or the like, embracing cutting out a blank to the desired form and involving a shank portion and end portions, cutting holes of the desired form in the said end portions, and providing bosses in the end portions by "spreading" the said holes.

2. The method of forming a sheet metal connecting rod, link, lever or the like, embracing cutting out a blank to the desired form and involving a shank portion and end portions, cutting holes of the desired form in the said end portions, providing bosses in the end portions by "spreading" the said holes, and finishing the edges of the blank.

3. The method of forming a sheet metal connecting rod, link, lever or the like, embracing cutting out a blank to the desired form, and involving a shank portion and end portions, cutting holes of the desired form in the said end portions, providing bosses in the end portions by "spreading" the said holes, and striking the blank to give it permanent set.

4. The method of forming a sheet metal connecting rod, link, lever or the like, which consists in cutting out blanks to the desired form and involving a shank portion, and end portions, forming bosses on said end portions, providing bolt bosses at one end portion, striking the blanks to give them permanent set and during the striking operation providing the blank with welding projections, and uniting the said blanks.

5. The method of forming a sheet metal connecting rod, link, lever or the like, which consists in cutting out blanks to the desired form and involving a shank portion, and end portions, forming bosses on said end portions, providing ribs for the shank portion, and striking the blanks to give them permanent set.

HEBRON B. LAYMAN.

Witnesses:
L. D. WISE,
W. A. KOSKEN.